United States Patent
D'Ambrosio

(10) Patent No.: US 12,392,637 B2
(45) Date of Patent: Aug. 19, 2025

(54) METHOD AND SYSTEM FOR ADAPTIVE MAP SURVEY ROUTE PLANNING

(71) Applicant: GM Global Technology Operations LLC, Detroit, MI (US)

(72) Inventor: Joseph G. D'Ambrosio, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 108 days.

(21) Appl. No.: 18/412,744

(22) Filed: Jan. 15, 2024

(65) Prior Publication Data

US 2025/0231044 A1 Jul. 17, 2025

(51) Int. Cl.
*G01C 21/00* (2006.01)
*G01C 21/34* (2006.01)

(52) U.S. Cl.
CPC ..... *G01C 21/3826* (2020.08); *G01C 21/3492* (2013.01); *G01C 21/3837* (2020.08)

(58) Field of Classification Search
CPC ............ G01C 21/3826; G01C 21/3837; G01C 21/3492
See application file for complete search history.

(56) References Cited

U.S. PATENT DOCUMENTS

2021/0141389 A1  5/2021  Jonak et al.
2023/0096982 A1  3/2023  Huang et al.

OTHER PUBLICATIONS

Randy Frank, How does SLAM help autonomous vehicles? https://www.sensortips.com/featured/how-does-slam-help-autonomous-vehicles/ (Year: 2022).*
SLAM—The Key to Avoiding Crashes, https://www.htx.gov.sg/techx/techxplain-slam (Year: 2022).*
Orisatoki et al., A Heuristic Informative-Path-Planning Algorithm for Autonomous Mapping of Unknown Areas, Smart Vehicle Control Laboratory (SVeCLab), School of Engineering and Informatics, University of Sussex, Brighton, UK, Aug. 2023.URL: https://arxiv.org/pdf/2308.12209 [abgerufen am Feb. 12, 2025].

* cited by examiner

*Primary Examiner* — Aryan E Weisenfeld
(74) *Attorney, Agent, or Firm* — Vivacqua Crane, PLLC

(57) ABSTRACT

A method for determining a route for a map surveyed includes receiving an initial survey plan and commanding the vehicle to move to survey a terrain by following the initial survey plan. Further, the method includes surveying the terrain with the plurality of sensors and determining a confidence level of each of the plurality of map areas surveyed with the plurality of sensors of the vehicle. Moreover, the method includes predicting a confidence level of each of the plurality of map areas yet to be surveyed according to the initial survey plan. The method also includes determining a confidence penalty based on the confidence data and determining whether the confidence penalty is greater than a predetermined threshold. Further, the method includes adapting the initial survey plan to produce an updated survey plan.

20 Claims, 4 Drawing Sheets

METHOD AND SYSTEM FOR ADAPTIVE MAP SURVEY ROUTE PLANNING

The present disclosure generally relates to a system and method for route planning. Specifically, the present disclosure relates to a system and method for adaptive map surveyed route planning based on terrain navigation costs and map and sensor data confidence.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Certain static, open-loop, map survey plans perform poorly when there is limited prior information about the terrain features of the area to be surveyed. Further, mobile platforms used for terrain surveying have limited onboard computational and storage resources. For these reasons, it is desirable to develop a system and method for efficiently surveying relatively unknown terrains using limited computational and storage resources.

SUMMARY

The present disclosure describes a method for adaptive route planning. The method includes receiving, by a controller of a vehicle, an initial survey plan. The initial survey plan includes a plurality of initial waypoints. The vehicle includes a plurality of sensors. The method further includes commanding the vehicle to move to survey a terrain by following the initial survey plan. The method also includes surveying the terrain with the plurality of sensors as the vehicle moves according to the initial survey plan to develop a map a of the terrain. The map of the terrain includes a plurality of map areas. The method also includes determining a confidence level of each of the plurality of map areas surveyed with the plurality of sensors of the vehicle to determine a real-time confidence data. The method also includes predicting a confidence level of each of the plurality of map areas yet to be surveyed according to the initial survey plan to determine a predicted confidence data. The method also includes merging the predicted confidence data with the real-time confidence data to determine a confidence penalty. The method also includes determining whether the confidence penalty is greater than a predetermined threshold. The method also includes adapting the initial survey plan to produce an updated survey plan in response to determining that the confidence penalty is greater than the predetermined threshold. The method also includes commanding the vehicle to move according to the updated survey plan. Other embodiments of this aspect include corresponding computer systems, apparatus, and computer programs recorded on one or more computer storage devices, each configured to perform the actions of the methods.

In certain aspect of the present disclosure, the method may include determining the next two waypoints using the updated survey plan; and updating the predicted confidence data based on the next two waypoints of the updated survey plan to develop an updated-predicted confidence data. The updated-predicted confidence data includes is determined based on the virtual line between the next two waypoints of the updated survey plan. Adapting the initial survey plan to produce an updated survey plan includes adding a new waypoint to the initial survey plan to create the updated survey plan, where the new waypoint includes location data in response to determining that the confidence penalty is greater than the predetermined threshold. The method may include identifying a sequence of nodes in a search graph that represents a minimum cost to travel between a first waypoint and a last waypoint. The confidence level of each of the plurality of map areas surveyed with the plurality of sensors of the vehicle is based on a distance between the vehicle and a corresponding one of the plurality of map areas surveyed with the plurality of sensors. The confidence level of each of the plurality of map areas surveyed with the plurality of sensors of the vehicle is based on a number of sensor measurements performed at the corresponding one of the plurality of map area served with the plurality of sensors. The confidence level of each of the plurality of map areas surveyed with the plurality of sensors of the vehicle is based on a number of sensor modalities used to survey the corresponding one of the plurality of map area served with the plurality of sensors. The confidence level of each of the plurality of map areas surveyed with the plurality of sensors of the vehicle is based on a data may include of a sensor data collected by the plurality of sensors at the corresponding one of the plurality of map area served with the plurality of sensors. The method may also include determining that the vehicle is incapable of reaching at least one of the plurality of initial waypoints. Further, the method may include updating the initial survey plan to produce the updated survey plan in response to determining that the vehicle is incapable of reaching at least one of the plurality of initial waypoints.

The present disclosure further describes a vehicle including a system for adaptive route planning. The vehicle includes sensors and a controller. The controller is programmed to execute the method described above.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
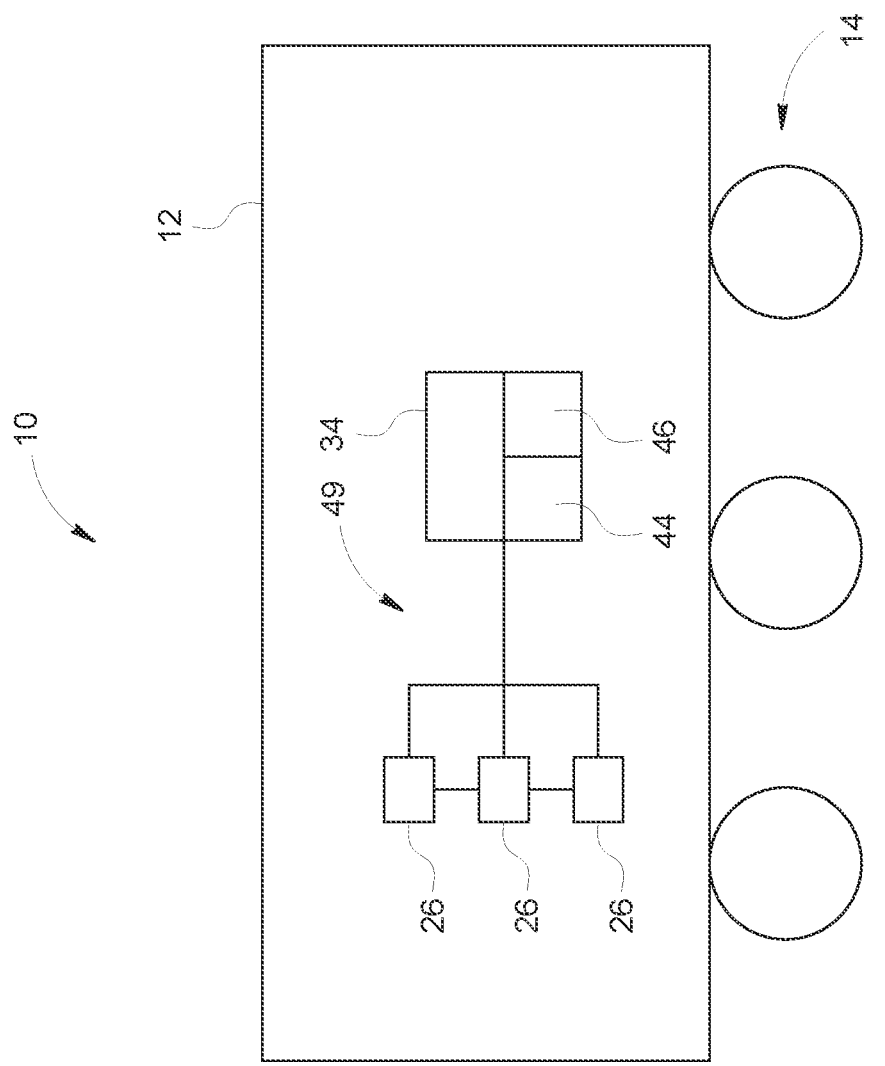
FIG. 1 is a schematic diagram of a vehicle including a system for video streaming.

Reference will now be made in detail to several examples of the disclosure that are illustrated in accompanying drawings. Whenever possible, the same or similar reference numerals are used in the drawings and the description to refer to the same or like parts or steps.

With reference to FIG. 1, a vehicle 10 generally includes a body 12 and a plurality of wheels 14 coupled to the body 12. The vehicle 10 may be an autonomous vehicle. In the depicted embodiment, the vehicle 10 is depicted in the illustrated embodiment as a lunar mobility vehicle, but it should be appreciated that other vehicles including autonomous underwater vehicles (AUVs), trucks, sport utility vehicles (SUVs), lunar terrain vehicles (LUV), etc., may also be used.

The vehicle 10 includes a controller 34 having at least one vehicle processor 44 and a vehicle non-transitory computer readable storage device or media 46. The vehicle processor 44 may be a custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, a combination thereof, or generally a device for executing instructions. The vehicle computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the vehicle processor 44 is powered down. The vehicle computer-readable storage device or media 46 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 34 in controlling the vehicle 10. The controller 34 of the vehicle 10 may be programmed to execute part or the entirety of the method 100 (FIG. 2) as described in detail below.

The instructions may include one or more separate programs, each of which comprises an ordered listing of executable instructions for implementing logical functions. The instructions, when executed by the vehicle processor 44, receive and process signals from sensors, perform logic, calculations, methods and/or algorithms for automatically controlling the components of the vehicle 10, and generate control signals to automatically control the components of the vehicle 10 based on the logic, calculations, methods, and/or algorithms. Although a single controller 34 is shown in FIG. 1, embodiments of the vehicle 10 may include a plurality of controllers 34 that communicate over a suitable communication medium or a combination of communication mediums and that cooperate to process the sensor signals, perform logic, calculations, methods, and/or algorithms, and generate control signals to automatically control features of the vehicle 10. The controller 34 is part of a system 49 for adaptive route planning.

The vehicle 10 further includes one or more sensors 26 coupled to the body 12. The sensors 26 are in communication with the controller 34 and sense observable conditions of the exterior environment and/or the interior environment of the vehicle 10. As non-limiting examples, the sensors 26 may include one or more cameras, one or more light detection and ranging (LIDAR) sensors, one or more proximity sensors, one or more ultrasonic sensors, one or more thermal imaging sensors, transceivers, and/or other sensors. Each sensor 24 is configured to generate a signal that is indicative of the sensed observable conditions (i.e., sensor data) of the exterior environment and/or the interior environment of the vehicle 10. The signal is indicative of the sensor data collected by the sensors 24.

Figure 2:
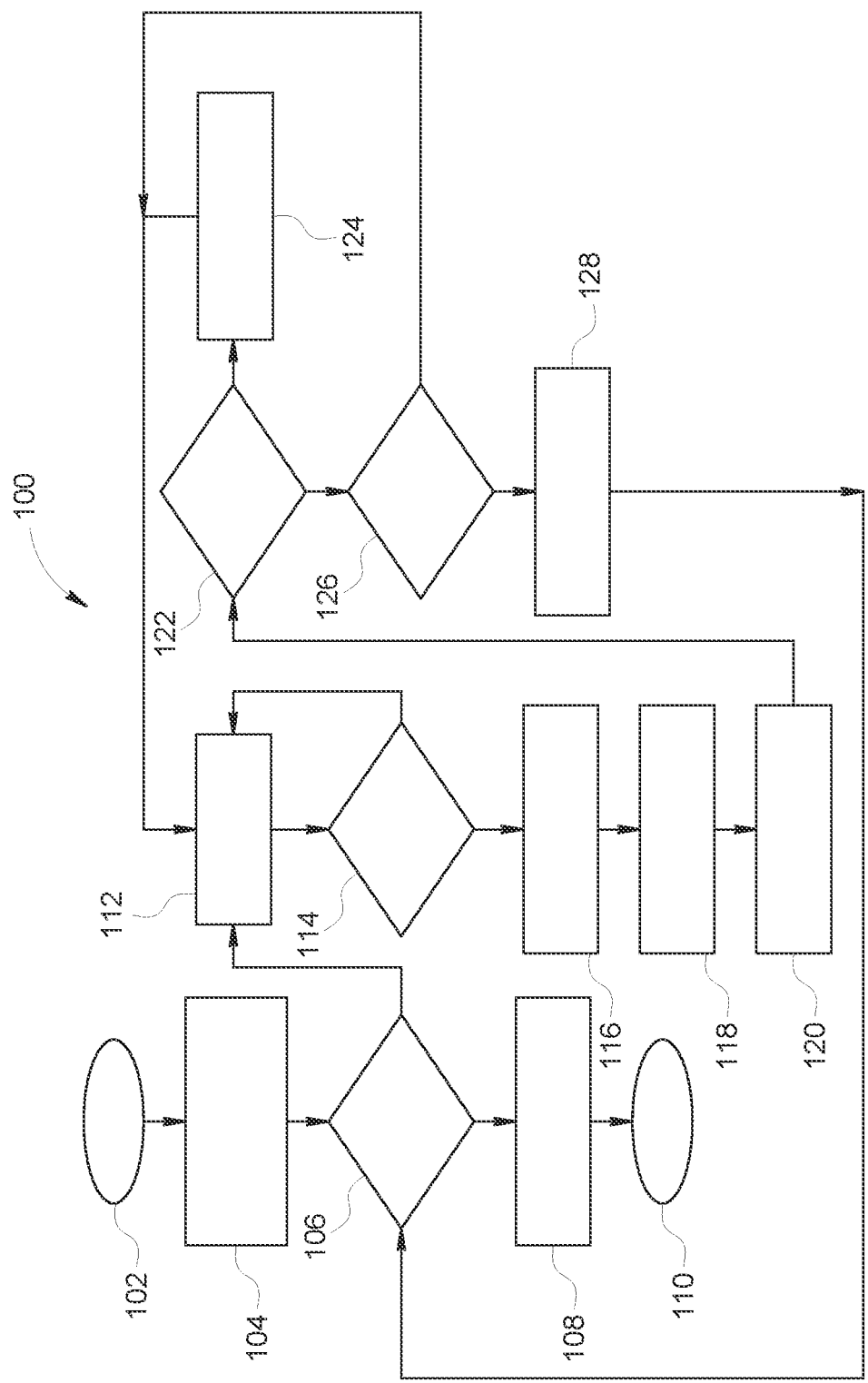
FIG. 2 is a flowchart of a method for adaptive route planning.

FIG. 2 is a flowchart of a method 100 for adaptive route planning. The method 100 beings at block 102. Then, the method 100 proceeds to block 104. At block 104, the controller 34 of the vehicle 10 receives an initial survey plan. The initial survey plan includes a plurality of initial waypoints. Further, at block 104, the controller 34 of the vehicle 10 initializes the confidence data structure, thereby setting the confidence level to zero or no confidence. Then, the method 100 proceeds to block 106.

At block 106, the controller 34 of the vehicle 10 determines whether there are any remaining waypoints in the waypoints list. If there are no waypoints remaining in the waypoint list, then the method 100 proceeds to block 108. At block 108, the controller 34 saves the final map of the terrain and the confidence data associated with the final map of the terrain in a quadtree or other suitable data structure. Next, the method 100 proceeds to block 110. At block 110, the method 100 ends. At block 106, if there are some waypoints remaining in the waypoint list, then the method 100 proceeds to block 112.

At block 112, the controller 34 commands the vehicle 10 to move to survey an unknown terrain by following the initial survey plan. While the vehicle 10 moves along the unknown terrain according to the initial survey plan, the vehicle 10 survey the terrain with the sensors 26 as the vehicle 10 moves according to the initial survey plan (or later adapted survey plan) to develop a map a of the terrain, thereby generating map data. The map of the terrain includes a plurality of map areas. Further, at block 112, the controller 34 of the vehicle 10 determines a confidence level of each of the plurality of map areas surveyed with the sensors 26 of the vehicle to determine a real-time confidence data. The confidence level of each of the plurality of map areas or cells surveyed with the sensors 26 of the vehicle 10 is based on the distance between the vehicle 10 and the map area surveyed with the sensors 26, the number of sensor modalities (e.g., Lidar, camera, etc.) used to surveyed the map area surveyed with the sensors 26, the number of sensor measurements used to surveyed the map area surveyed with the sensors 26, the data consistency of the sensor data collected by the sensors 26 and/or the sensing performance capability of each sensor 26. For instance, sensors 26 with high accuracy and resolution will produce higher confidence data. Also, the more consistent the sensor data is among different sensor modalities (e.g., camera, Lidar, radar, etc.) for a particular map area, the higher the confidence level will be for that particular map area. Similarly, the higher the number of sensor modalities data used to survey a particular map area, the higher the confidence level will be for that particular map area. Likewise, the higher the distance between the vehicle 10 to the map area surveyed, the lower the confidence level will be for that particular map area. The real-time confidence data is indicative of the confidence level of the sensor data of each surveyed map area. The map data and the real-time confidence data may be stored in quadtree or other suitable data structure. Then, the method 100 proceeds to block 114.

At block 114, the controller 34 of the vehicle 10 assesses whether a predetermined milestone has been reached. The milestone may be a predetermined confidence level for the map areas or map cells surveyed by the sensors 26 of the vehicle 10. For example, the milestone may be that the confidence level for the each of the map areas surveyed by the sensors 26 is greater than eighty-percent. If the milestone has not been reached, the method 100 returns to block 112. If the milestone has been reached, then the method 100 proceeds to block 116.

At block 116, the controller 34 of the vehicle 10 predicts a confidence level of each of the plurality of map areas yet to be surveyed according to the initial survey plan to determine a predicted confidence data. The confidence level of each of the map areas that will be surveyed with the sensors 26 of the vehicle 10 is based on the distance between the vehicle 10 and the map area that will be surveyed with the sensors 26 and/or the number of sensor modalities (e.g., Lidar, camera, etc.), used to surveyed the map area served with the sensors 26. For instance, the higher the number of sensor modalities data used to survey a particular map area, the higher the confidence level will be for that particular map area. Likewise, the higher the distance between the vehicle 10 to the map area that will be surveyed, the lower the confidence level will be for that particular map area. The predicted confidence data is indicative of the confidence level of the sensor data of each of the map areas that will be surveyed. Then, the method 100 proceeds to block 118.

At block 118, the controller 34 of the vehicle 10 merges the predicted confidence data with the real-time confidence data to develop a merged data. Then, the method 100 proceeds to block 120. At block 120, the controller 34 of the vehicle 10 determines a confidence penalty based on the merged data. Then, the method 100 proceeds to block 122.

At block 122, the controller 34 of the vehicle 10 determines whether the confidence penalty is greater than a predetermined threshold (e.g., 80%). If the confidence penalty is greater than the predetermined threshold, then the method 100 proceeds to block 124. At block 124, the controller 34 of the vehicle 10 adapts the survey plan (i.e., changes the initial survey plan) in response to determining that the confidence penalty is greater than the predetermined threshold. After block 124, the method 100 returns to block 112, the confidence penalty is not greater than the predetermined threshold, then the method 100 proceeds to block 126.

At block 126, the controller 34 of the vehicle 10 determines whether the vehicle 10 has reached the first waypoint of the initial survey plan and surveyed the map area around the first waypoint of the initial survey plan. If the vehicle 10 has not reached the first waypoint of the initial survey plan or has not surveyed the map area around the first waypoint of the initial survey plan, then the method 100 returns to block 112. If the vehicle 10 has reached the first waypoint of the initial survey plan and has surveyed the map area around the first waypoint of the initial survey plan, then the method 100 proceeds to block 128. At block 128, the controller 34 of the vehicle 10 removes waypoint around the map area that has been surveyed by the sensors 26 from the waypoint list. Then, the method 100 returns to block 106.

Figure 3:
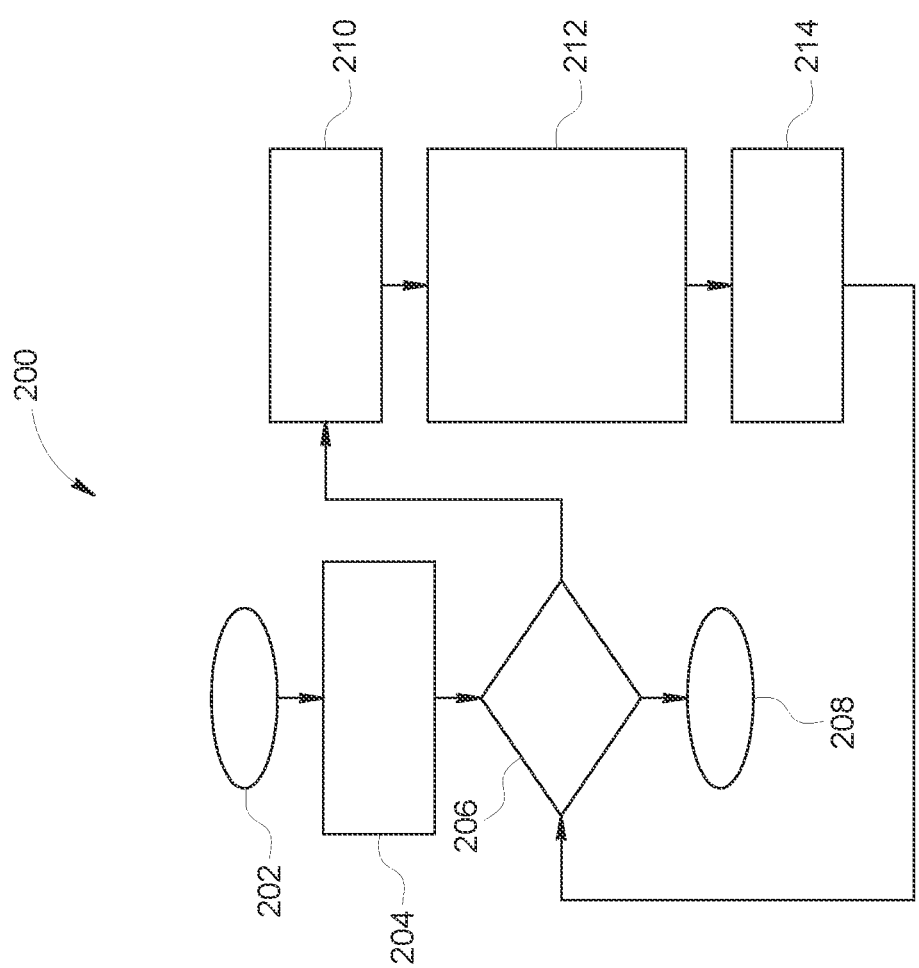
FIG. 3 is a flowchart of a method for predicting data confidence for the remaining survey plan.

FIG. 3 is a subroutine or method 200 for predicting the confidence data of map areas that will be surveyed in the future according to survey plan (e.g., initial or adapted survey plan). The method 200 begins at block 202 and describes the specifics of the block 116 discussed above with respect to the method 100 of FIG. 2. Then, the method 200 continues to block 204. At block 204, the controller 34 of the vehicle 10 generates a prediction waypoint list by equating the remaining waypoints yet to be surveyed as the prediction waypoint list. Then, the method 200 proceeds to block 206.

At block 206, the controller 34 determines whether at least two waypoints remain in the prediction waypoint list. If less than two waypoints remain in the prediction waypoint list, then the method 100 proceeds to block 208. At block 208, the method 200 ends, and, in the method 100, the controller 34 continues to execute block 118. If at least two waypoints remain in the prediction waypoint list, then the method 200 proceeds to block 210.

At block 210, the controller 34 determines and selects the next two immediately adjacent waypoints in the prediction waypoint list. Next, the method 200 continues to block 212. At block 212, At block 212, the controller 34 updates the map area (or cell) confidence level for each map area or cell in the confidence data structure. In other words, the predicted confidence data is updated based on the next two immediately adjacent waypoints of the updated survey plan to develop an updated-predicted confidence data. To do so, for each map area or cell in the confidence data structure, the controller 34 constructs a virtual line between the next two immediately adjacent waypoints of the updated survey plan. Then, the controller 34 determines a new confidence level based on this virtual line between the next two immediately adjacent waypoints in the prediction waypoint list. Then, the updated confidence level is equated to the greater of the current confidence level and the updated confidence level determined based on the virtual line between the next two immediately adjacent waypoints of the prediction waypoint list. As discussed above, the confidence level of each of the plurality of map areas or cells surveyed with the sensors 26 of the vehicle 10 is based on the distance between the vehicle 10 and the map area surveyed with the sensors 26, the number of sensor modalities (e.g., Lidar, camera, etc.) used to surveyed the map area served with the sensors 26 and/or the data consistency of the sensor data collected by the sensors 26. Then, the method 200 continues to block 214. At block 214, the controller 34 removes the first prediction waypoint from the prediction waypoint list. Next, the method 100 returns to block 206.

Figure 4:
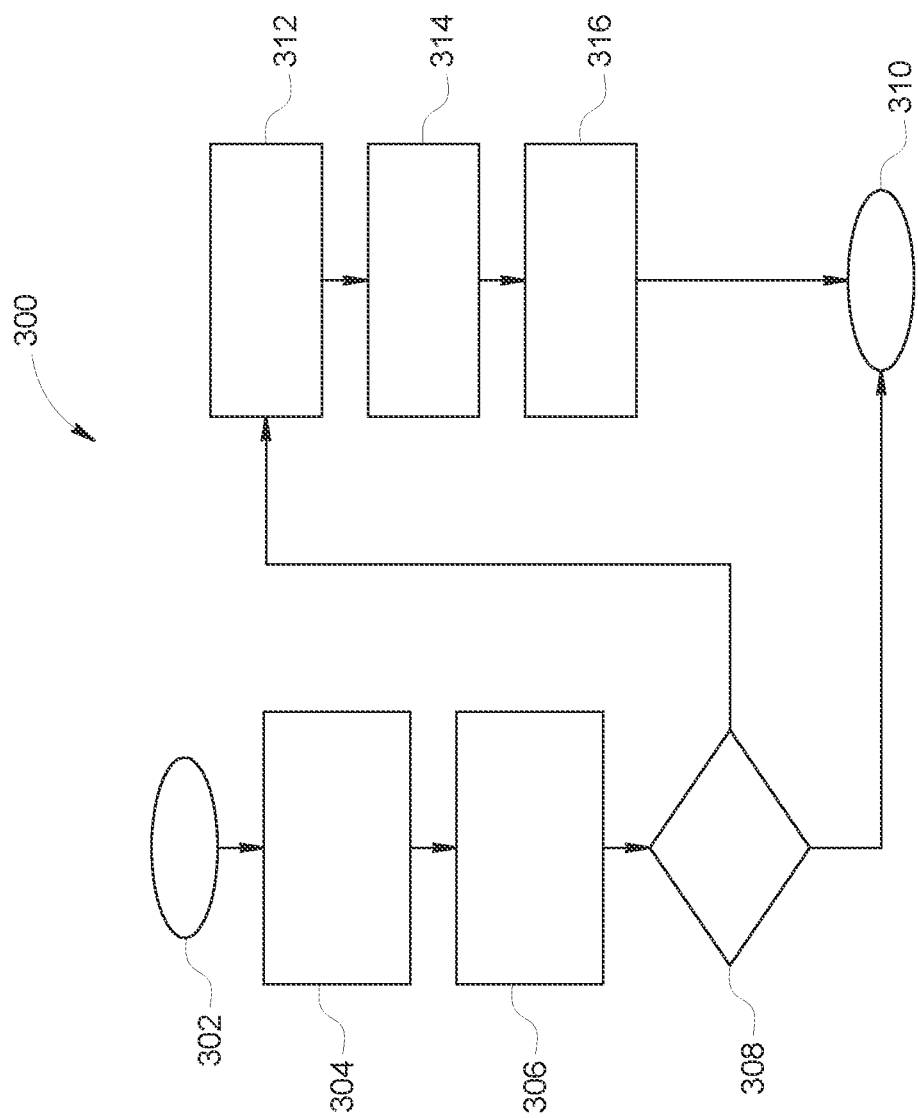
FIG. 4 is a flowchart of a method for adapting a survey plan.

FIG. 4 is a flowchart of a subroutine or method 400 for adapting a survey plan. The method 300 begins at block 304 and describes the specifics of the block 124 discussed above with respect to the method 100 of FIG. 2. Then, the method 400 continues to block 304. At block 304, the controller 34 develops a new "adapt" confidence data structure at a specified abstraction level from the existing confidence data structure. The "adapt" confidence data structure includes solely the map areas or cells in which the confidence penalty is greater than the predetermined threshold. To do so, the controller 34 decomposes and/or integrates map areas or cells as needed. Then, the method 400 proceeds to block 306.

At block 306, the controller 34 adds a node (e.g., a Quadtree node) with location data in a search graph for each "adapt" map area or cell in which the confidence penalty is greater than a predetermined threshold. The method 300 then continues to block 308. At block 308, the controller 34 determines whether the search graph. If the search graph is empty, then the method 300 proceeds to block 310. At block 310, the method 300 ends and, in the method 100, the controller 34 continues to execute block 112. If the search graph is not empty, then the method 300 continues to block 312.

At block 312, the controller 34 the controller 34 identifies a sequence of nodes (e.g., Quadtree nodes) in the search graph that represents the minimum costs path to travel between all nodes (e.g., the first waypoint and the last waypoint). To do so, the controller 34 applies a minimum path algorithm (e.g., traveling salesman heuristic algorithm) to generate new customed map survey with ordered waypoints. Then, the controller 34 determines the travel cost based upon distance and navigation cost to develop a navigation cost map. The controller 34 generates an updated survey plan by selecting the path with the minimum cost. Then, the method 300 continues to block 314.

At block 314, the controller 34 updates the search node graph for any needed custom maneuvers. To do so, the controller 34 determines that the vehicle 10 is physically incapable of reaching at least one of the waypoints (e.g., initial waypoints or adapted waypoints) and, in response, the controller 34 executes an A* algorithm or another suitable informed search algorithm toto identify detailed waypoints considering known navigation costs, thereby developing an updated survey map that avoid the waypoint or waypoints that the vehicle 10 cannot physically reach. In other words, the controller 34 adapts the initial survey plan (or another adapted survey plan) to generate the updated survey plan. Then, the method 300 proceeds to block 316.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for determining a route for a map surveyed, comprising:
   receiving, by a controller of a vehicle, an initial survey plan, wherein the initial survey plan includes a plurality of initial waypoints, and the vehicle includes a plurality of sensors;
   commanding the vehicle to move to surveyed a terrain by following the initial survey plan;
   surveying the terrain with the plurality of sensors as the vehicle moves according to the initial survey plan to develop a map a of the terrain, wherein the map of the terrain includes a plurality of map areas;
   determining a confidence level of each of the plurality of map areas surveyed with the plurality of sensors of the vehicle to determine a real-time confidence data;
   predicting a confidence level of each of the plurality of map areas yet to be surveyed according to the initial survey plan to determine a predicted confidence data;
   merging the predicted confidence data with the real-time confidence data to determine a confidence penalty;
   determining whether the confidence penalty is greater than a predetermined threshold;
   in response to determining that the confidence penalty is greater than the predetermined threshold, adapting the initial survey plan to produce an updated survey plan;
   commanding the vehicle to move according to the updated survey plan.

2. The method of claim 1, further comprising:
   determining a next two waypoints using the updated survey plan; and updating the predicted confidence data based on the next two waypoints of the updated survey plan to develop an updated-predicted confidence data.

3. The method of claim 2, further comprising constructing a virtual line between the next two waypoints of the updated survey plan, wherein the updated-predicted confidence data includes is determined based on the virtual line between the next two waypoints of the updated survey plan.

4. The method of claim 3, wherein adapting the initial survey plan to produce an updated survey plan includes:
in response to determining that the confidence penalty is greater than the predetermined threshold, adding a new waypoint to the initial survey plan to create the updated survey plan, wherein the new waypoint includes location data.

5. The method of claim 4, further comprising identifying a sequence of nodes in a search graph that represent a minimum cost to travel between a first waypoint and a last waypoint.

6. The method of claim 5, wherein the confidence level of each of the plurality of map areas surveyed with the plurality of sensors of the vehicle is based on a distance between the vehicle and a corresponding one of the plurality of map areas surveyed with the plurality of sensors.

7. The method of claim 6, wherein the confidence level of each of the plurality of map areas surveyed with the plurality of sensors of the vehicle is based on a number of sensor measurements performed at the corresponding one of the plurality of map area served with the plurality of sensors.

8. The method of claim 7, wherein the confidence level of each of the plurality of map areas surveyed with the plurality of sensors of the vehicle is based on a number of sensor modalities used to surveyed the corresponding one of the plurality of map area served with the plurality of sensors.

9. The method of claim 8, wherein the confidence level of each of the plurality of map areas surveyed with the plurality of sensors of the vehicle is based on a data consistency of a sensor data collected by the plurality of sensors at the corresponding one of the plurality of map area served with the plurality of sensors.

10. The method of claim 9, wherein adapting the initial survey plan to produce an updated survey plan includes:
determining that the vehicle is incapable of reaching at least one of the plurality of initial waypoints; and
in response to determining that the vehicle is incapable of reaching of the at least one of the plurality of initial waypoints, updating the initial survey plan to produce the updated survey plan.

11. A vehicle, comprising:
a plurality of sensors;
a controller in communication with the plurality of sensors, wherein the controller is programmed to:
receive an initial survey plan, wherein the initial survey plan includes a plurality of initial waypoints, and the vehicle includes a plurality of sensors;
command the vehicle to move to surveyed a terrain by following the initial survey plan;
surveyed the terrain with the plurality of sensors as the vehicle moves according to the initial survey plan to develop a map a of the terrain, wherein the map of the terrain includes a plurality of map areas;
determine a confidence level of each of the plurality of map areas surveyed with the plurality of sensors of the vehicle to determine a real-time confidence data;
predict a confidence level of each of the plurality of map areas yet to be surveyed according to the initial survey plan to determine a predicted confidence data;
merge the predicted confidence data with the real-time confidence data to determine a confidence penalty;
determine whether the confidence penalty is greater than a predetermined threshold;
in response to determining that the confidence penalty is greater than the predetermined threshold, adapt the initial survey plan to produce an updated survey plan;
command the vehicle to move according to the updated survey plan.

12. The vehicle of claim 11, wherein the controller is programmed to:
determine a next two waypoints using the updated survey plan; and
update the predicted confidence data based on the next two waypoints of the updated survey plan to develop an updated-predicted confidence data.

13. The vehicle of claim 12, wherein the controller is programmed to construct a virtual line between the next two waypoints of the updated survey plan, and the updated-predicted confidence data includes is determined based on the virtual line between the next two waypoints of the updated survey plan.

14. The vehicle of claim 13, wherein the controller is programmed to:
in response to determining that the confidence penalty is greater than the predetermined threshold, add a new waypoint to the initial survey plan to create the updated survey plan, wherein the new waypoint includes location data.

15. The vehicle of claim 14, wherein the controller is programmed to identify a sequence of nodes in a search graph that represents a minimum cost to travel between a first waypoint and a last waypoint.

16. The vehicle of claim 15, wherein the confidence level of each of the plurality of map areas surveyed with the plurality of sensors of the vehicle is based on a distance between the vehicle and a corresponding one of the plurality of map areas surveyed with the plurality of sensors.

17. The vehicle of claim 16, wherein the confidence level of each of the plurality of map areas surveyed with the plurality of sensors of the vehicle is based on a number of sensor measurements performed at the corresponding one of the plurality of map area served with the plurality of sensors.

18. The vehicle of claim 17, wherein the confidence level of each of the plurality of map areas surveyed with the plurality of sensors of the vehicle is based on a number of sensor modalities used to surveyed the corresponding one of the plurality of map area served with the plurality of sensors.

19. The vehicle of claim 18, wherein the confidence level of each of the plurality of map areas surveyed with the plurality of sensors of the vehicle is based on a data consistency of a sensor data collected by the plurality of sensors at the corresponding one of the plurality of map area served with the plurality of sensors.

20. The vehicle of claim 19, wherein the controller is programmed to:
determine that the vehicle is incapable of reaching at least one of the plurality of initial waypoints; and
in response to determining that the vehicle is incapable of reaching of the at least one of the plurality of initial waypoints, update the initial survey plan to produce the updated survey plan.

* * * * *